US012691703B2

(12) United States Patent
    Gouerec

(10) Patent No.:     US 12,691,703 B2
(45) Date of Patent:          Jul. 28, 2026

(54) COLORING PENCIL LEAD FOR SYNTHETIC PENCIL BASED ON BIOPOLYMERS BLENDS

(71) Applicant: SOCIÉTÉ BIC, Clichy Cedex (FR)

(72) Inventor: Julien Gouerec, Clichy Cedex (FR)

(73) Assignee: SOCIÉTÉ BIC, Clichy Cedex (FR)

( * ) Notice: Subject to any disclaimer, the term of this patent is extended or adjusted under 35 U.S.C. 154(b) by 702 days.

(21) Appl. No.: 18/247,207

(22) PCT Filed: Sep. 24, 2021

(86) PCT No.: PCT/EP2021/076383

§ 371 (c)(1),
(2) Date: Mar. 29, 2023

(87) PCT Pub. No.: WO2022/069371

PCT Pub. Date: Apr. 7, 2022

(65) Prior Publication Data

US 2023/0373236 A1      Nov. 23, 2023

(30) Foreign Application Priority Data

Sep. 30, 2020    (EP) .................................... 20306125

(51) Int. Cl.
    *C09D 13/00*       (2006.01)
    *B43K 19/02*       (2006.01)
    *B43K 19/18*       (2006.01)
    *C08L 67/04*       (2006.01)
    *C09D 167/00*      (2006.01)

(52) U.S. Cl.
    CPC .............. *B43K 19/18* (2013.01); *B43K 19/02* (2013.01); *C08L 67/04* (2013.01); *C09D 13/00* (2013.01)

(58) Field of Classification Search
    CPC ........................... C09D 13/001; C09D 167/00
    USPC ................................. 106/31.01, 31.11, 31.12
    See application file for complete search history.

(56) References Cited

U.S. PATENT DOCUMENTS

| | | | |
|---|---|---|---|
| 6,572,295 B1 | 6/2003 | Chochoy et al. | |
| 9,096,758 B2 | 8/2015 | Loos et al. | |

| | | | | |
|---|---|---|---|---|
| 2002/0025995 A1* | 2/2002 | Leidner | .................. | C09D 13/00 |
| | | | | 524/386 |
| 2004/0016366 A1* | 1/2004 | Hashimoto | ............ | C09D 13/00 |
| | | | | 106/31.12 |
| 2017/0015858 A1* | 1/2017 | Herbolsheimer | ........ | C09D 7/45 |

FOREIGN PATENT DOCUMENTS

| | | | | |
|---|---|---|---|---|
| CN | 102391631 | A | * | 3/2012 |
| DE | 202013008738 | U1 | | 1/2015 |
| DE | 202013011022 | U1 | | 3/2015 |
| EP | 2631060 | A1 | | 8/2013 |
| EP | 3052574 | B1 | | 6/2017 |
| JP | H10212400 | A | * | 8/1998 |
| JP | H11309980 | A | | 11/1999 |
| JP | 2001226492 | A | | 8/2001 |
| JP | 2007262295 | A | * | 10/2007 |
| WO | 0143987 | A1 | | 6/2001 |
| WO | 2015049026 | A1 | | 4/2015 |
| WO | 2016097533 | A1 | | 6/2016 |
| WO | 2016097554 | A1 | | 6/2016 |
| WO | 2016097555 | A1 | | 6/2016 |
| WO | 2017220914 | A1 | | 12/2017 |
| WO | 2020049148 | A1 | | 3/2020 |
| WO | 2020049149 | A1 | | 3/2020 |

OTHER PUBLICATIONS

Machine translation of CN-102391631-A (no date).*
Machine translation of JP-10212400-A (no date).*
Machine translation of JP-2007262295-A (no date).*
International Search Report and Written Opinion issued in International Application PCT/EP2021/076383 on Dec. 12, 2021 (11 pages).

* cited by examiner

*Primary Examiner* — Michael J Feely
(74) *Attorney, Agent, or Firm* — Bookoff McAndrews, PLLC

(57)                  ABSTRACT

The present invention relates to a polymer-based extendable lead or refill for writing, drawing and/or painting tools comprising a binder comprising a mixture of polylactide with at least one polymer having a flexural modulus inferior to the flexural modulus of polylactide and at least one filler. It also relates to writing, drawing and/or painting tool, advantageously a pencil, comprising lead or a refill according to the invention and to the use of a binder comprising a mixture of polylactide with at least one polymer having a flexural modulus inferior to the flexural modulus of polylactide according to the invention to improve the vividness of polymer-based extrudable lead or refill for writing, drawing and/or painting tools.

21 Claims, No Drawings

COLORING PENCIL LEAD FOR SYNTHETIC PENCIL BASED ON BIOPOLYMERS BLENDS

CROSS REFERENCE TO RELATED APPLICATIONS

This application is a National Stage Application of International Application No. PCT/EP2021/076383, filed on Sep. 24, 2021, now published as WO2022/069371 and which claims priority to European Application No. 20306125.4, filed on Sep. 30, 2020, the entire contents of which is incorporated herein by reference.

TECHNICAL FIELD

The present disclosure concerns polymer-based extrudable lead or refill for writing, drawing and/or painting tools comprising polylactide in admixture with other polymers as the binder.

The main advantage of using a polymer-based pencil lead (also named synthetic lead) included into a synthetic casing as a coloring pencil, is to combine the benefits of a cost-efficient process of co-extrusion where the different layers (lead and casing, and optionally intermediate protective layer) can be assembled in 1 step, with good mechanical performances of the lead. Indeed, this polymer part brings resistance, especially shock resistance to drop test (i.e. when pencil falls on the floor), avoids the formation of cracks all the pencil long and prevents from split leads. Moreover these polymers are easily transformed with high outputs by extrusion and enable to get a consistent compound with pigments, fillers and additives dispersed inside.

However for these purposes, the lead is based on a polymer as the matrix, the polymer being most of the time petro-sourced such as styrenic polymers:ABS (acrylonitrile-butadiene-styrene) or PS (polystyrene) or polyolefin. These polymers are all from the petroleum industry. Petro-sourced materials have very long term degradation (more than 400.000 years) compared to traditional wood case pencils. Therefore, for ecological reasons, it would be interesting to be able to replace such thermoplastic polymers with bio-renewable polymers.

BACKGROUND

Patent application WO2015049026 describes a lead containing PLA as the binder in order to avoid the use of petro-sourced polymer. Nevertheless quality of the deposit is lower with a disappointing color intensity/vividness. Thus, PLA as sole structuring agent does not make a good substitute for polymers derived from petroleum such as polystyrene in the manufacture of the lead casing for pencil.

In particular, an objective of the present disclosure is to obtain a pencil lead, more specifically co-extrudable, combining good mechanical properties such as resistance of the pencil lead, in particular resistance to breakage, while exhibiting smoothness and/or a good laydown (easiness and quality of the deposit), and/or intensity and/or vividness of the deposit, without this lead encountering the problems of the prior art (being based only on petro-source polymers).

SUMMARY

The inventors have surprisingly found that it is possible to solve this problem by using a mixture of polylactide with at least one polymer, in particular a biopolymer, having a flexural modulus inferior to the flexural modulus of polylactide, as the binder of the lead.

Indeed the lead obtained has good mechanical resistance (resistance of the pencil lead, in particular resistance to breakage) combined with a smoother and richer deposit and in particular better vividness and color intensity than with PLA as the only binder and even than polyolefin (polypropylene (PP) or polyethylene (PE)) as the only binder, the vividness and color intensity being equivalent to the one of PS or ABS matrix but with the main advantage of not containing only petro-source polymer.

A first object of the present disclosure therefore relates to a polymer-based extrudable lead or refill more specifically for writing, drawing and/or painting tools, even more specifically for drawing, comprising:
1. a binder comprising a mixture of polylactide with at least one polymer having a flexural modulus inferior to the flexural modulus of polylactide and
2. at least one filler.

More specifically, the polymer-based extrudable lead or refill further comprises at least one coloring agent.

More specifically an object of the disclosure is a polymer-based extrudable lead or refill, more specifically for writing, drawing and/or painting tools, and even more specifically for drawing, comprising:
1. a binder comprising a mixture of polylactide with at least one polymer having a flexural modulus inferior to the flexural modulus of polylactide, more specifically having a flexural modulus of below 3000 MPa measured according to the standard ISO 178:2019, more specifically of below 2800 MPa, even more specifically of below 2500 MPa;
2. at least one filler
3. at least one coloring agent
4. at least one slip agent and/or at least one wax.

More specifically the polymer-based extrudable lead or refill can further comprise at least one additive.

More specifically an object of the disclosure is a polymer-based extrudable lead or refill for pencil, more specifically such as graphite or color pencil or a mechanical pencil.

A second object of the present disclosure is a writing, drawing, and/or painting tool, more specifically a pencil, comprising a lead according to the disclosure. More specifically the disclosure pertains to a drawing tool such as a pencil, more specifically such as graphite or color pencil or a mechanical pencil.

A third object of the present disclosure is the use of a binder comprising a mixture of polylactide with at least one polymer having a flexural modulus inferior to the flexural modulus of polylactide to improve the vividness of polymer-based extrudable lead or refill, more specifically for writing, drawing and/or painting tools, more specifically for drawing.

DETAILED DESCRIPTION

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

The lead or refill according to the present disclosure thus belongs to the category of polymer-based leads or refills, also referred to as synthetic polymer-based leads or refills, more specifically bio-renewable polymer-based leads or refills, and it is thus non-calcined. Therefore, no calcining step/baking step is used in its manufacturing method.

In the sense of the present disclosure, the term "polymer-based lead or refill" is understood to mean any lead or refill for writing, drawing and/or painting tools comprising at least one polymer. According to the present disclosure, the term "polymer" means compounds (in particular large molecules or macromolecules) comprising many repeated units, in particular at least two repeating units, more specifically at least ten repeating units. This polymer thus functions as a matrix/binder for the production of the lead or refill during the manufacturing method and in particular also governs the mechanical properties, the writing quality and erasing quality in the finished product.

The lead or refill according to the present disclosure is extrudable, i.e. it can be obtained by extrusion. It is more specifically extruded. The lead according to the present disclosure is more specifically non-expanded. In fact, more specifically no expansion agent is used in its manufacturing method. In addition, more specifically the polymer used is not expanded.

The writing, drawing and/or painting tools can for example be a pencil such as graphite or color pencil or a mechanical pencil. More specifically it is a color pencil. Therefore more specifically the polymer-based extrudable lead or refill according to the present disclosure is a color lead or refill, in particular a color pencil lead.

The lead or refill according to the disclosure comprises a binder.

The binder comprises, more specifically consists essentially of, in particular consists of, a mixture of polylactide with at least one polymer having a flexural modulus inferior to the flexural modulus of polylactide.

As a consequence the binder comprises polylactide (also named PLA or polylactic acid). PLA is commercially available for example from NaturePlast. The flexural modulus of PLA is in the range 3000-3500 MPa measured according to the standard ISO 178:2019.

The binder comprises also a polymer having a flexural modulus inferior to the flexural modulus of polylactide. More specifically, such a polymer has a flexural modulus<3000 MPa, more specifically of below 2800 MPa, more specifically of below 2500 MPa, measured according to the standard ISO 178:2019. In an advantageous embodiment, the polymer of the lead having a flexural modulus inferior to the flexural modulus of polylactide is selected from the group consisting of polyethylene (PE), poly(butylene adipate-co-terephtalate) (PBAT), poly(butylene succinate) (PBS), a starch-based polymer and a mixture thereof, in particular the polyethylene can be high density polyethylene (PEND) or low density polyethylene (PELD). More specifically the polymer having a flexural modulus inferior to the flexural modulus of polylactide is poly(butylene succinate) (PBS) or a starch-based polymer, in particular a starch-based polymer, more specifically a modified starch-based polymer.

In a particular advantageous embodiment the polymer having a flexural modulus inferior to the flexural modulus of polylactide according to the disclosure is a biopolymer (also called bio-renewable polymer).

In the sense of the present disclosure, "biopolymer" is understood to mean any polymer with is renewable and/or which is obtained from a renewable biological resource and/or which is biodegradable. Therefore it is not a petro-source polymer.

As a consequence in an advantageous manner the polymer having a flexural modulus inferior to the flexural modulus of polylactide according to the disclosure is selected in the group consisting of bio-polyethylene (bio-PE), poly(butylene adipate-co-terephtalate) (PBAT), poly(butylene succinate) (PBS), a starch-based polymer and a mixture thereof, in particular the bio-polyethylene can be high density bio-polyethylene (bio-PEND) or low density bio-polyethylene (bio-PELD). More specifically the polymer having a flexural modulus inferior to the flexural modulus of polylactide is poly(butylene succinate) (PBS) or a starch-based polymer, in particular a starch-based polymer, more specifically a modified starch-based polymer.

The bio-polyethylene (bio-PE) according to the disclosure may be partially or completely bio-based polyethylene. The term "bio-based" as used in the description indicates the inclusion of some components that derive from a material derived from renewable biological resources. The minimum bio-based content of the bio-polyethylene (bio-PE) may be greater than or equal to 50% by weight, specifically 60% by weight, more specifically 70% by weight, and even more specifically 80% by weight. Bio-polyethylene (bio-PE), also known as renewable polyethylene, is made out of ethanol, which becomes ethylene after a dehydration process. It can be made from various feedstocks including sugar cane, sugar beet and wheat grain. The bio-polyethylene (bio-PE) may be a low-density polyethylene, a linear low-density polyethylene, a high-density polyethylene, an ultra-high-molecular-weight polyethylene, a cross-linked polyethylene, a high density crosslinked polyethylene, a medium density polyethylene, a very low density polyethylene, as well as their copolymers and mixtures thereof. The bio-polyethylene (bio-PE) may be more specifically a high density bio-polyethylene (bio-PEHD), for example commercialized by Braskem under the reference Bio-PE SPB608.

In the sense of the present disclosure, "starch-based polymer" is understood to mean any polymer which is obtained by using starch and/or which is derived from starch as one of its component, more specifically corn starch. The starch-based polymer according to the disclosure could be obtained by using various physical or chemical modifications of starch such as blending (for example with cellulose), derivation and graft copolymerization. It can be for example obtained from a mixture of starch or derived starch product with monomer or polyesters derived from vegetable oil, cellulose and/or glycerin. The derived starch product can be amylose and/or amylopectin from starch, which then can be complexed with a complexing agent and can form either a layered product, one of the layer being made of amylopectin and the other made of amylose, the layers being complexed by a complexing agent, or a core product whose core is made of amorphous amylopectin surrounded by molecules of complexed amylose. The starch-based polymer can be a thermoplastic starch. In the sense of the present disclosure "thermoplastic starch" is intended to mean any starch product in which, during the extrusion process, the granular structure of native starch is disrupted, combined by the action of temperature and shear forces and, in the presence of a plasticizer, forms a melted polymeric system. The starch-based polymer can be a starch-poly-ε-caprolactone such as Mater-Bi® Z commercialized by Novamont. The starch-based polymer can also be composed of starch and cellulose acetate blends such as Mater-Bi® Y commercialized by Novamont. The starch-based polymer can also be a strong complex between thermoplastic starch (TPS) and copolymers of polyvinyl alcohol (PVA) such as Mater-Bi® A commercialized by Novamont. The starch-based polymer can also be based on TPS and PBAT blend such as Mater-Bi® N commercialized by Novamont. Therefore in particular the starch-based polymer is commercialized under the tradename Mater-bi®, in particular Mater-Bi® Z, Mater-Bi® Y, Mater-Bi® A, Mater-Bi® N and Mater-bi® CE02A by Novamont.

More specifically, the total amount of the mixture of polylactide with at least one polymer having a flexural modulus inferior to the flexural modulus of polylactide (total amount of polylactide+polymer having a flexural modulus inferior to the flexural modulus of polylactide) is of 20-50 wt. %, more specifically 25-45 wt. %, even more specifically 30-40 wt. %, based on the total weight of the lead or refill.

In another advantageous embodiment the weight ratio between polylactide and at least one polymer having a flexural modulus inferior to the flexural modulus of polylactide, is of 0.2 to 20, more specifically 0.4 to 15, even more specifically 0.5 to 10, even more specifically 1 to 8. According to this advantageous embodiment, it means that the weight ratio polylactide/at least polymer having a flexural modulus inferior to the flexural modulus of polylactide is of 1/5 to 20/1 (i.e. the content of polylactide is ranging between 5 times less to 20 times more than the content of the at least one polymer having a flexural modulus inferior to the flexural modulus of polylactide), more specifically 2/5 to 15/1, even more specifically 1/2 to 10/1, even more specifically 1/1 to 8/1.

In still another embodiment the total amount of at least one polymer having a flexural modulus inferior to the flexural modulus of polylactide is at least 2 wt. %, more specifically is of 2-45 wt. %, even more specifically is of 3-30 wt. %, even more specifically is of 5-20 wt. %, based on the total weight of the lead or refill.

In still another embodiment the total amount of polylactide is of 5-48 wt. %, more specifically of 10-40 wt. %, even more specifically is of 15-30 wt. %, even more specifically is of 20-30 wt. %, in particular it is 24.5 wt. %, based on the total weight of the lead or refill.

The lead or refill according to the present disclosure, in particular the pencil lead, contains at least one filler.

In an advantageous embodiment the at least one filler is selected in the group consisting of mineral filler, more specifically selected in the group consisting of clay, talc, boron nitride (in particular hexagonal boron nitride), silica, calcium carbonate, mica, steatite powder, graphite, titanium dioxide, chalk, barite and mixtures thereof (graphite is in particular used for graphite lead or refill), more specifically selected in the group consisting of lamellar mineral filler, still more specifically in the group consisting of colorless or white mineral filler, further still more specifically selected in the group consisting of clay, talc, boron nitride, silica, calcium carbonate, mica, steatite powder, chalk, barite and mixtures thereof. In particular the at least one filler is selected in the group consisting of colorless or white lamellar mineral filler, particularly selected in the group consisting of clay, boron nitride, mica, talc and mixtures thereof, more particularly it is a clay, still more particularly selected in the group consisting of montmorillonite, bentonite, kaolin and mixture thereof, and further still more particularly it is kaolin, even in the form of calcinated kaolin.

More specifically the total amount of the at least one filler is of 5-50 wt. %, even more specifically 10-30 wt. %, even more specifically 15-25 wt. %, based on the total weight of the lead or refill.

The lead or refill according to the present disclosure, in particular the pencil lead according to the present disclosure, can more specifically contain at least a coloring agent.

More specifically the coloring agent is selected in the group consisting of dye, pigments and mixtures thereof, even more specifically in the group consisting of organic or inorganic pigments, dyes or lacquered dyes, coated mica as well as coated or uncoated metal bronzed, $TiO_2$, carbon black, graphite and mixture of theses coloring agents. The term "pigments" should be understood as meaning white or coloured, mineral or organic particles of any form, which are insoluble in the medium, and which are intended to color the lead. The term "dyes" should be understood as meaning white or colored, mineral or organic particles of any form, which are soluble in the medium, and which are intended to color the lead. In an advantageous embodiment, the coloring agent is selected in the group consisting of pigments and mixtures thereof, still more specifically in the group consisting of organic pigment, $TiO_2$ and mixtures thereof. Depending on the desired color of the lead, the pigment is a red, black, yellow, orange, blue, magenta, or violet pigment, and mixture thereof.

The pigment and/or carbon black can be coated or mixed with a polyolefin wax (for example in the form of a masterbatch, a pigmentary preparation or a dispersion of pigment in a polyolefin wax) as mentioned in WO2016/097555 and WO2016/097533. The coloring agent gives the lead color.

More specifically, the total amount of the at least one coloring agent is of 1-30 wt. %, even more specifically 5-25 wt. %, even more specifically 10-15 wt. %, based on the total weight of the lead or refill.

According to this embodiment, more specifically the pencil lead according to the disclosure is a color pencil lead or a graphite pencil lead, even more specifically a color pencil lead.

More specifically, according to this embodiment in which the color pencil lead according to the present disclosure contains at least a coloring agent (colored pencil lead), the obtained deposit (laydown) when applied on a surface, such as paper, exhibits a good intensity (or vividness) of the color.

The lead or refill according to the present disclosure, in particular the pencil lead according to the present disclosure, can more specifically contain at least one slip agent.

Indeed slip agents are able to modify the surface properties of a film and thus lower the friction between film layers and other surfaces. To be particularly effective the slip agent needs to migrate out of the polymer to the surface and therefore it is advantageous for it to have a degree of incompatibility with the polymer.

The benefits of the use of a slip agent in the lead composition are: enhance both appearance and function (to improve smoothness and/or glides), improve the flow characteristic of the polymer during processing.

Slip agents are effective because of their natural tendency "to bloom" to the surface of the film after extrusion.

In another advantageous embodiment, the at least one slip agent is selected in the group consisting of amides such as ethylene bis stearamide, oleamide, erucamide and stearamide; glycerol derivatives such as glycerol esters in particular glycerol ethylhexyl polyhydroxystearate, glycerol behenate, glycerol dibehenate, tribehin, glycerol trihydroxystearate and mixtures thereof; esters of pentaerythritol such as pentaerythrityl tetrastearate, and mixtures thereof.

The lead or refill according to the present disclosure, in particular the pencil lead according to the present disclosure, can contain a wax.

For the purpose of the present disclosure, the term "wax" is intended to mean a lipophilic compound, which is solid at room temperature (25° C.), with a reversible solid/liquid change of state, and having a melting point of 30° C. or more, which may be up to 180° C. In the present disclosure, the melting point corresponds to the transition stage between a fully crystalline or partially crystalline solid state and an amorphous liquid of variable viscosity, as described in ISO 11357-3; 2011. The term "transition", also referred to as "fusion", is characterized by an endothermic peak in the DSC curve.

The melting point of wax can be measured by differential scanning calorimetry (DSC) using a TA Instruments Q20 apparatus, on a temperature range from 20 to 90° C., at cooling/heating speeds of 10° C./minute.

This measurement is made with 5 mg of sample mass.

Method

1. Equilibrate at 0° C.
2. Mark end of cycle
3. Ramp: 10° C./min to 90° C.
4. Isothermal for 2 min
5. Ramp: 10° C./min to 0° C.
6. Isothermal for 2 minutes
7. End of method In particular, the waxes may be hydrocarbon-based waxes, lignite-waxes, amide waxes, fatty acids, fatty acid esters, and/or ester waxes, and mixtures thereof, and may be of plant, mineral, animal and/or synthetic origin. More specifically the wax according to the disclosure is selected in the group consisting of ester waxes, more specifically chosen among stearate waxes (melting point: 120-160° C.), calcium stearate, magnesium stearate and zinc stearate, lignite waxes such as montan waxes, amide waxes, hydrocarbon-based waxes such as paraffin (melting point: 50-60° C.), fatty acids such as stearic acid and palmitic acid, fatty acid esters such as esters of stearic acid and mixtures thereof, more specifically ester waxes, even more specifically stearate waxes.

More specifically the at least one wax is selected in the group consisting of stearate waxes, in particular in the group consisting of magnesium stearate, calcium stearate, zinc stearate and mixtures thereof, even more specifically calcium stearate, zinc stearate and mixtures thereof, more specifically it is calcium stearate.

More specifically the at least one slip agent and/or at least one wax are selected in the group consisting of amides such as ethylene bis stearamide, oleamide, erucamide and stearamide; glycerol derivatives, such as glycerol esters; esters of pentaerythritol; stearic acid; esters of stearic acid; salts of stearic acid such as magnesium stearate, calcium stearate, zinc stearate and mixtures thereof, even more specifically calcium stearate, zinc stearate and mixtures thereof; and mixtures thereof.

More specifically the total amount of the at least one slip agent and/or at least one wax, even more specifically of esters of stearic acid, is of 3-40 wt. %, even more specifically 5-35 wt. %, even more specifically 10-30 wt. % based on the total weight of the lead or refill.

More specifically the composition comprises at least one wax, and the total amount of the at least one wax, even more specifically of stearate salt, is of 3-40 wt. %, even more specifically 5-35 wt. %, even more specifically 10-30 wt. % based on the total weight of the lead or refill.

In a further advantageous embodiment, the lead or refill according to the disclosure also contains an additive. This additive may be chosen from additives that are well known to those skilled in the art in the field of leads and refills, in particular it is more specifically selected in the group consisting of processing agents, coupling agents, dispersants, lubricants, plasticizers such as phthalate, adipate, benzoate, sebacate and/or citrate plasticizers (in particular in a total amount of 0-10%, more specifically 0-5% by weight based on the total weight of the lead or refill), surface-active agents, thermal stabilizers and mixtures thereof.

More specifically the total amount of the additive of the lead or refill according to the disclosure, in particular of the pencil lead according to the disclosure, is in the range 0-15%, even more specifically 3-15%, even more specifically 3-10%, by weight relative to the total weight of the lead or refill.

More specifically, an object of the disclosure is a polymer-based extrudable lead or refill, more specifically for writing, drawing and/or painting tools, and even more specifically for drawing, comprising:

1. a binder comprising a mixture of polylactide with at least one polymer having a flexural modulus inferior to the flexural modulus of polylactide (more specifically having a flexural modulus of below 3000 MPa measured according to the standard ISO 178:2019, more specifically of below 2800 MPa, even more specifically of below 2500 MPa);
2. at least one filler, more specifically wherein the at least one filler is selected in the group consisting of mineral filler, even more specifically selected in the group consisting of clay, talc, boron nitride, silica, calcium carbonate, mica, steatite powder, graphite, titanium dioxide, chalk, barite and mixtures thereof;
3. at least one coloring agent;
4. at least one slip agent and/or at least one wax, more specifically
wherein the slip agent is selected in the group consisting of amides such as ethylene bis stearamide, oleamide, erucamide and stearamide; glycerol derivatives such as glycerol esters in particular glycerol ethylhexyl polyhydroxystearate, glycerol behenate, glycerol dibehenate, tribehin, glycerol trihydroxystearate and mixtures thereof; esters of pentaerythritol such as pentaerythrityl tetrastearate, and mixtures thereof, and/or
wherein the wax is chosen from hydrocarbon-based waxes, lignite-waxes, amide waxes, fatty acids, fatty acid esters, and/or ester waxes, and mixtures thereof, more specifically chosen from ester waxes such as stearate waxes, calcium stearate, magnesium stearate and zinc stearate, lignite waxes such as montan waxes, amide waxes, hydrocarbon-based waxes such as paraffin (melting point: 50-60° C.), fatty acids such as stearic acid and palmitic acid, fatty acid esters such as esters of stearic acid and mixtures thereof;
1. optionally at least one additive, more specifically wherein the at least additive is selected in the group consisting of processing agents, coupling agents, dispersants, lubricants, plasticizers such as phthalate, adipate, benzoate, sebacate and/or citrate plasticizers, surface-active agents, thermal stabilizers and mixtures thereof.

More specifically, an object of the disclosure is a polymer-based extrudable lead or refill, more specifically for writing, drawing and/or painting tools, and even more specifically for drawing, comprising:

1. a binder comprising a mixture of polylactide with at least one polymer having a flexural modulus inferior to the flexural modulus of polylactide (more specifically having a flexural modulus of below 3000 MPa measured according to the standard ISO 178:2019, more specifically of below 2800 MPa, even more specifically of below 2500 MPa); wherein the total amount of the mixture of polylactide and at least one polymer having a flexural modulus inferior to the flexural modulus of polylactide is of 20-50 wt. %, more specifically 25-45 wt. %, more even more specifically 30-40 wt. %, based on the total weight of the lead or refill;

2. at least one filler, wherein the total amount of the at least one filler is of 5-50 wt. %, more specifically 10-30 wt. %, more even more specifically 15-25 wt. %, based on the total weight of the lead or refill, even more specifically wherein the at least one filler is selected in the group consisting of mineral filler, even more specifically selected in the group consisting of clay, talc, boron nitride, silica, calcium carbonate, mica, steatite powder, graphite, titanium dioxide, chalk, barite and mixtures thereof;

3. at least one coloring agent, wherein the total amount of the at least one coloring agent is of 1-30 wt. %, more specifically 5-25 wt. %, even more specifically 10-15 wt. %, based on the total weight of the lead or refill;

4. at least one slip agent and/or at least one wax, wherein the total amount of the at least one slip agent and/or at least one wax is of 3-40 wt. %, more specifically 5-35 wt. %, even more specifically 10-30 wt. % based on the total weight of the lead or refill, more specifically wherein the slip agent is selected in the group consisting of amides such as ethylene bis stearamide, oleamide, erucamide and stearamide; glycerol derivatives such as glycerol esters in particular glycerol ethylhexyl polyhydroxystearate, glycerol behenate, glycerol dibehenate, tribehin, glycerol trihydroxystearate and mixtures thereof; esters of pentaerythritol such as pentaerythrityl tetrastearate, and mixtures thereof, and/or wherein the wax is chosen from hydrocarbon-based waxes, lignite-waxes, amide waxes, fatty acids, fatty acid esters, and/or ester waxes, and mixtures thereof, more specifically chosen from ester waxes such as stearate waxes, calcium stearate, magnesium stearate and zinc stearate, lignite waxes such as montan waxes, amide waxes, hydrocarbon-based waxes such as paraffin (melting point: 50-60° C.), fatty acids such as stearic acid and palmitic acid, fatty acid esters such as esters of stearic acid and mixtures thereof;

5. optionally at least one additive, wherein the total amount of the additive is of 0-15%, more specifically 3-15%, even more specifically 3-10%, by weight relative to the total weight of the lead or refill, more specifically wherein the at least one additive is selected in the group consisting of processing agents, coupling agents, dispersants, lubricants, plasticizers such as phthalate, adipate, benzoate, sebacate and/or citrate plasticizers, surface-active agents, thermal stabilizers and mixtures thereof.

Another object of the present disclosure is a writing, drawing, and/or painting tool, more specifically a pencil, comprising a lead according to the disclosure and as described previously. More specifically the disclosure pertains to a pencil, more specifically such as graphite or color pencil or a mechanical pencil.

Another object of the present disclosure is the use of a binder comprising a mixture of polylactide with at least one polymer having a flexural modulus inferior to the flexural modulus of polylactide, more specifically in combination with at least one filler, at least a coloring agent, an more specifically at least one slip agent and/or at least one wax, optionally with an additive, to improve the vividness of polymer-based extrudable lead or refill, more specifically for writing, drawing and/or painting tools, more specifically for drawing.

In a particular embodiment of the present disclosure, the lead or refill has a diameter between 2 and 4.5 mm; more specifically it is a lead or refill having a diameter between 2 and 2.3 mm (thin lead/refill) or a lead or refill having a diameter between 2.8 and 3.8 mm (thick lead/refill) or a lead or refill having a diameter between 3.4 and 4.2 mm (very thick lead/refill).

More specifically, the lead or refill according to the present disclosure can have a hexagonal, round or triangular cross section, even more specifically a round or hexagonal cross section.

The lead or refill according to the present disclosure can be manufactured by methods which are well known to the person skilled in the art.

For example, all the components are mixed together, and the mixture obtained is extruded at suitable temperatures. The lead or refill obtained is then cooled. It is thus not calcined.

The lead or refill according to the present disclosure thus exhibits an improved color intensity/vividness, in particular color saturation, while possessing good mechanical properties, in particular in terms of flexural strength, and while producing a continuous deposit on paper with smoothness. According to another advantageous embodiment of the disclosure, the lead according to the disclosure is a pencil lead and is characterized in that the pencil flexural resistance value, based on a nominal diameter of 2.8, is greater than 0.4 daN, more specifically greater than 0.45 daN.

The present disclosure also relates to a writing, drawing and/or painting tool, more specifically a pencil, comprising a lead or a refill according to the present disclosure and as described above, more specifically it is a color pencil.

In particular the pencil according to the disclosure, such as the color pencil, is coated with or contained within a lead casing which is more specifically a wood or synthetic wood material and which even more specifically surrounds, in particular concentrically, the lead according to the disclosure. The lead casing can also contain PLA, more specifically alone or as a blend with other polymer(s), such as in admixture with polybutylene succinate such as described in patent applications WO 2020/049149 and WO 2020/049148.

Optionally the pencil according to the disclosure, such as the color pencil, comprises a protective intermediate layer, disposed between the lead according to the disclosure and the lead casing, for example as described in patent applications WO 01/43987, WO 2017/220914 and WO 2016/097554.

In particular, the lead casing is based on styrene polymer and the protective intermediate layer also acts as an adhesion layer and may more specifically comprise a mixture of EVA and polystyrene or an ethylene ($C_1$-$C_4$ alkyl) acrylate copolymer, alone or as a blend with a styrene polymer, as described in patent applications WO 2017/220914 and WO 2016/097554.

According to another embodiment, the protective intermediate layer also acts as an adhesion layer and may more specifically comprise PLA, alone or as a blend with another polymer, for example in admixture with EVA, in particular when the lead casing is based on PLA polymer.

More specifically, the lead casing is expanded, so as to have a density equivalent to that of natural wood.

In a particular embodiment of the present disclosure, the pencil according to the disclosure comprises an additional decorative layer, more specifically of varnish, surrounding the lead casing, in particular concentrically. More specifically, the decorative layer is made of a material that is compatible with that of the lead casing.

More specifically, the pencil according to the present disclosure may have a hexagonal, round or triangular, even more specifically round or hexagonal, cross section.

More specifically, it may comprise an erasing means, such as an eraser, at the non-sharpened end of the pencil.

More specifically, the pencil according to the disclosure, such as the color pencil, is obtained by coextrusion of the lead according to the disclosure/optional protective layer/lead casing/optional decorative layer. In a preferred embodiment, the coextrusion makes it possible to prepare in a single step a continuous rod consisting of the four aforementioned layers of the pencil, these being assembled in the chosen order, lead according to the disclosure/optional protective layer/lead casing/optional decorative layer. For this, four single-screw extruders, each delivering the material constituting a layer, are connected in a coextrusion head tooling associating in the right order the layers between them. Multiple extrusion techniques are well known to the person skilled in the art. By way of example, such methods for continuously manufacturing pencils are described in document U.S. Pat. No. 6,572,295.

Another object of the disclosure is a writing, drawing and/or painting tool, more specifically a pencil, comprising a lead or a refill as described before, more specifically wherein it is obtained by extrusion.

The present disclosure finally relates to the use of a binder comprising a mixture of polylactide with at least one polymer having a flexural modulus inferior to the flexural modulus of polylactide and as defined above to improve the vividness or color intensity of polymer-based extrudable lead or refill for writing, drawing and/or painting tools, more specifically the color saturation and/or intensity and/or a richer deposit, in particular of lead containing PLA.

The disclosure will be understood more clearly on reading the description of the examples that follow, which are given as a non-limiting guide.

The expressions "between . . . and . . . " or "ranging from . . . to . . . " Should be understood as including the values of the limits.

EXAMPLES

Examples of composition of pencil lead according to the present disclosure (examples 1, 2, 3, 4) comprising a binder having a mixture of polylactide with at least one polymer having a flexural modulus inferior to the flexural modulus of polylactide were compared with comparative composition of pencil lead (comparative example 1 and 2) wherein the polymer has been replaced by a polymer having a flexural modulus superior to the flexural modulus of polylactide (comparative example 1) and wherein the binder comprises only polylactide (comparative example 2).

The pencil leads are produced by carrying out the steps detailed below:
1. Mixing and granulating all formulation components of the lead to form a writing substance granulate;
2. Extruding the writing substance granulate at a temperature in the range of 130 to 200° C. on an extruder by a suitable mouthpiece to form endless writing substance strands. In particular, the leads are manufactured from the below compositions by extrusion of a strip using a laboratory single-screw extruder, with 3 zones heated at 170° C., and a round die having a diameter of 2 mm followed by a drawing bench.
3. Cooling and hardening the endless writing substance strand;
4. Cutting the endless writing substance strand to final lengths, in particular to the required pencil length.

The properties of color vividness ($\Delta C$) and Pencil Flexural resistance (Flexion (daN)) of the leads were measured as follow:

Pencil Flexural Resistance:

The pencil flexural resistance test was carried out in order to check the resistance of the pencil lead, in particular the resistance to breakage, in particular a value of above 0.4 is considered as acceptable for lead with a diameter of above 2 mm.

The characteristics of the test were as follows:
Equipment: Dynamometer LLOYD-AMETEK Instrument type, U-bracket span of 6 cm, Sensor ADAMEL DY20 Chatillon Instrument type TCD110 50 daN
Descent speed of sensor: 50 $mm \cdot min^{-1}$
Operating method:
1. Turn on the dynamometer.
2. Locate the sensor in the up position.
3. Fix the pencil on the U-bracket.
4. Go down the needle.
5. Record the results expressed in daN.

The diameter differences between the samples that may occur due to the die swell are compensated by calculating 3-point pencil flexural resistance, relative to nominal value of 2.8 mm.

Colorimetry:

The test protocol is as follows:
Equipment:
Writing apparatus HUTT HST 10 or equivalent used under the following conditions: Writing speed: 4.5 m/min
Writing angle: 70°
Other parameters: refer to table 1 below
Iso paper: AURORA ISO-14145
Apparatus KONICA MINOLTA model CM-3610 A
Pencil sharpener
Viewing angle of light: 10°

TABLE 1

| | Parameters for producing the rubbings |
|---|---|
| Article type | Lead |
| Diameter lead (mm) | 2.14 |
| Paper feed (mm/min) | 0.15 |
| Total weight article/support/ additional weight (g) | 175 |
| Writing length for axial rotation of the article (m) | 9 |
| Writing length (m) | 40 |
| Paper type | AURORA ISO-14145 |

Operating procedure:
1) Prepare the writing article in the appropriate supports, sharpen the lead if necessary.
2) Produce the rubbings according to the parameters indicated in the preceding table
3) Measure the density of the color of the rubbing with the help of the spectroEye (minimum 2 measurements per blackness) according to DIN 16536 NB. Protocol of measurement of the density of the color of the rubbing with the help of the spectroEye (minimum 2 measurements per blackness) according to DIN 16536 NB:

$$\Delta E = \sqrt{(L*-L_0*)^2 + (a*-a_0*)^2 + (b*-b_0*)^2}$$

To determine the "vividness" of a lead in accordance with the invention, the measurement of colorimetry can be performed. The "vividness" should be understood as the intensity of the deposit i.e. laydown of the pencil when applied on a surface. The vividness can be measured by colorimetry test by measuring the color difference AC between a sample color and a comparative color.

b*, a* indicating the axis of red/green shades and b* the axis of yellow/blue shades. The chromaticity C* is obtained from the following formula.

$$C_{ab}^* = \sqrt{a^{*2} + b^{*2}}$$

All colorimetric measurements have been done on a deposit made on a white paper. The greater the value of C* (also called $C_{ab}^*$), the better the saturation of the color of the deposit.

The composition (in weight %) and results of the examples and comparative examples are indicated in tables 2 below:

TABLE 2

| Components | Content in wt. % | | | | | |
| | Ex 1 (invention) | Ex 2 (invention) | Ex 3 (invention) | Ex 4 (invention) | Comparative example 1 | Comparative example 2 |
| --- | --- | --- | --- | --- | --- | --- |
| Polylactide (Luminy 175 commercialized by Corbion) | 24.5 | 24.5 | 24.5 | 24.5 | 24.5 | 35 |
| Bio-PE (Bio-PE SPB608 commercialized by Brasken) | 10.5 | — | — | — | — | |
| PBS (PBI 003 commercialized by Natureplast) | — | 10.5 | — | — | — | |
| PBAT (PBE006 commercialized by Natureplast) | — | — | 10.5 | — | — | |
| Mater-bi (Mater-Bi ® CE02A commercialized by Novamont) | | | | 10.5 | — | |
| PHA (PolyHydroxy Alcanoate) (PHI 002 commercialized by Natureplast) | — | — | — | — | 10.5 | |
| Calcium stearate | 25 | 25 | 25 | 25 | 25 | 25 |
| Kaolin | 20 | 20 | 20 | 20 | 20 | 20 |
| Zinc stearate | 3 | 3 | 3 | 3 | 3 | 3 |
| Benzoflex (benzoate esters) | 5 | 5 | 5 | 5 | 5 | 5 |
| Pigment Red 254 | 12 | 12 | 12 | 12 | 12 | 12 |
| Total | 100% | 100% | 100% | 100% | 100% | 100% |
| Flexion (daN) | >0.4 | >0.4 | >0.4 | >0.4 | >0.4 | >0.4 |
| C* | 19.53 | 19.77 | 19.38 | 20.02 | 16.35 | 17.55 |

The density of the color of the deposit has been measured in the CIE L*a*b* system using a KONICA MINOLTA CM-3610 A model spectrocolorimeter in the CIE Lab system (illuminant: D65, angle 10°, specular components included).

According to this system, L* indicates the lightness of the color of the deposit. The lowest is the value of L, the most intense (or "darker") is the color of the deposit. The chromaticity coordinates are expressed by the parameters a* and As a consequence, the leads of example 1, 2, 3, and 4 according to the invention which comprise a binder comprising a mixture of polylactide with at least one polymer having a flexural modulus inferior to the flexural modulus of polylactide have good flexural properties (good resistance of the lead) and enhanced color vividness, in particular compared to the lead of comparative example 2 wherein the mixture of polylactide with at least one polymer having a flexural modulus inferior to the flexural modulus of polylactide has been replaced by polylactide and compared to lead of comparative example 1.

In addition, the smoothness of the lead has been evaluated by writing, drawing and/or coloring manually with the leads according to examples 1 to 4 and it has been observed that they deliver an effortless writing, drawing and/or coloring experience on paper.

The invention claimed is:

1. A polymer-based lead or refill for writing, drawing and/or painting tools, the polymer-based lead or refill comprising, based on a total weight of the polymer-based lead or refill:

5 wt. % to 48 wt. % of a polylactide binder;

2 wt. % to 45 wt. % of at least one polymer binder, other than the polylactide binder, having a flexural modulus inferior to the flexural modulus of the polylactide binder;

5 wt. % to 50 wt. % of at least one filler;

1 wt. % to 30 wt. % of at least one coloring agent, other than the at least one filler; and 3 wt. % to 40 wt. % of at least one slip agent and/or 3 wt. % to 40 wt. % of at least one wax;

wherein a total amount of the polylactide binder and the at least one polymer binder is 20 wt. % to 50 wt. %, based on the total weight of the polymer-based lead or refill; and wherein the polymer-based lead or refill is extrudable.

2. The polymer-based lead or refill according to claim 1, wherein the at least one polymer binder has a flexural modulus <3000 MPa measured according to standard ISO 178:2019.

3. The polymer-based lead or refill according to claim 1, wherein the at least one polymer binder is selected from the group consisting of polyethylene (PE), poly(butylene adipate-co-terephtalate) (PBAT), poly(butylene succinate) (PBS), a starch-based polymer, and mixtures thereof.

4. The polymer-based lead or refill according to claim 1, wherein the at least one polymer binder is a starch-based polymer.

5. The polymer-based lead or refill according to claim 1, wherein a total amount of the polylactide binder and the at least one polymer binder is 30 wt. % to 40 wt. %, based on the total weight of the polymer-based lead or refill.

6. The polymer-based lead or refill according to claim 1, wherein the at least one polymer binder is present in an amount of 5 wt. % to 20 wt. %, based on the total weight of the polymer-based lead or refill.

7. The polymer-based lead or refill according to claim 1, wherein the polylactide binder is present in an amount of 20 wt. % to 30 wt. %, based on the total weight of the polymer-based lead or refill.

8. The polymer-based lead or refill according to claim 1, wherein a weight ratio of the polylactide binder to the at least one polymer binder ranges from 0.2 to 20.

9. The polymer-based lead or refill according to claim 1, wherein a weight ratio of the polylactide binder to the at least one polymer binder ranges from 0.5 to 10.

10. The polymer-based lead or refill according to claim 1, wherein the at least one filler is a mineral filler.

11. The polymer-based lead or refill according to claim 1, wherein the at least one filler is a clay.

12. The polymer-based lead or refill according to claim 1, wherein the at least one filler is selected from the group consisting of montmorillonite, bentonite, kaolin, and mixtures thereof.

13. The polymer-based lead or refill according to claim 1, wherein the at least one filler is kaolin.

14. The polymer-based lead or refill according to claim 1, wherein the at least one filler is present in an amount of 15 wt. % to 25 wt. %, based on the total weight of the polymer-based lead or refill.

15. The polymer-based lead or refill according to claim 1, wherein the at least one coloring agent is present in an amount of 10 wt. % to 15 wt. %, based on the total weight of the polymer-based lead or refill.

16. The polymer-based lead or refill according to claim 1, wherein the at least one slip agent is present in an amount of 10 wt. % to 30 wt. % and/or the at least one wax is present in an amount of 10 wt. % to 30 wt. %, based on the total weight of the polymer-based lead or refill.

17. The polymer-based lead or refill according to claim 1, which is a color lead or refill.

18. A writing, drawing and/or painting tool comprising the polymer-based lead or refill of claim 1.

19. The polymer-based lead or refill according to claim 1, wherein the at least one wax is selected from the group consisting of stearate waxes, calcium stearate, magnesium stearate, zinc stearate, montan waxes, amide waxes, paraffin, and mixtures thereof.

20. The polymer-based lead or refill according to claim 1, which has a diameter ranging from 2 mm to 4.5 mm.

21. The polymer-based lead or refill according to claim 1, wherein the at least one slip agent is selected from the group consisting of amides, glycerol derivatives, esters of pentaerythritol, and mixtures thereof.

* * * * *